Patented Sept. 28, 1954

2,690,255

UNITED STATES PATENT OFFICE 2,690,255

METHOD OF PACKING ADHESIVES IN SHIPPING CONTAINERS FOR EASY REMOVAL

Edward W. Kaiser, Maywood, and John D. Czarnecki, Oak Park, Ill., assignors to American Can Company, New York, N. Y., a corporation of New Jersey No Drawing. Application October 30, 1951,
Serial No. 253,954

15 Claims. (Cl. 206—84)

This invention relates to a method of packing adhesive materials directly into a shipping container in such a manner that the adhesive will not adhere to the wall of the package and can be readily removed therefrom. It relates more particularly to a method of packing hot melt or thermoplastic adhesives in a package having a smooth inner surface coated with an oily, liquid organo-silicon polymer to which the adhesive will not stick. It also relates to a shipping package having a non-wicking, heat resistant, smooth inner surface coated with an adhesive repelling material such as the aforementioned polymer.

An object of this invention is the provision of a method of packaging a thermoplastic adhesive in such a manner that the adhesive will not adhere to the walls of the package during packing, shipping or removal.

Another object is the provision of a shipping package having a smooth, non-wicking, heat resistant wall construction with an inner surface coated with an adhesive repelling material such as an oily, liquid, organo-silicon polymer, which package also functions as a setting mold for the adhesive, permitting the adhesive to be readily removed from the package in a single piece.

Another object is the provision of a method of pouring a molten hot melt adhesive into a container having a smooth, non-wicking, inner surface coated with an oily, liquid, organo-silicon polymer to render the thus coated surface adhesive repellent and permit the hot melt to solidify into a solid block which can be readily removed from the package.

Numerous other objects and advantages of the invention will be apparent as it is better understood from the following description which is a preferred embodiment thereof.

Hot melt adhesives are made from thermoplastic natural or synthetic resins, with or without plasticizers and with or without fillers. They contain no solvent. Such adhesives have several advantages over the solution types, especially in the container manufacturing industry, where severe shrinkage of a bonding material on drying cannot be tolerated or where traces of solvent vapors will contaminate a packed product to make it unmerchantable. Hot melt adhesives usually have fairly high melting or softening temperatures. In the molten or "soft" stage they are very tacky and adhere well to web materials, but have poor cohesive strength. As the adhesive cools or sets, the cohesive strength increases, so that when the adhesive or bonding agent solidifies, the material which is bonded frequently will tear without rupturing the adhesive. It is this characteristic of hot melt adhesives that has made packaging a difficult and expensive operation. In the past, after blending and thoroughly mixing ingredients in a melted state, the adhesive, while still molten, was poured into trays and allowed to harden or solidify. When completely set, the surface of the adhesive adjacent the tray was melted and the block was removed from the tray. After permitting the melted surfaces to resolidify, the adhesive was comminuted into relatively fine particles, and packaged in this state or it was wrapped in block form. In another method, the molten adhesive was poured into a container with a small opening and solidified. To remove the adhesive it was necessary to melt the entire contents and pour it from the package. Because of the high viscosity of the adhesive the latter procedure was quite wasteful of material. In each of the former methods, considerable handling and remelting of at least a portion of the adhesive was necessary.

We have found that hot melt adhesives can be packed by filling the molten adhesive from the mixing equipment directly into a shipping container having a smooth, non-wicking or wick-free inner surface, which is coated with an oily, liquid, organo-silicon polymer. The filled container may be capped either before or after setting of the adhesive. The organo-silicon polymer has the characteristic of making the smooth inner surface of the packaging adhesive-repellent, so that when the adhesive solidifies or sets it shrinks slightly and draws away from the walls of the package. Thus, since the dimensions of the solid adhesive block are slightly smaller than those of the package, the entire solid block can be removed by merely inverting an open package and permitting the adhesive to slide out. It is not necessary, however, that the adhesive dray away from the container wall. We have found that the oily, liquid, organo-silicon polymer serves equally well for adhesives that exhibit a considerable amount of cold flow, such that the cross sectional dimension of the block is the same as the interior of the container. The liquid organo-silicon polymer, under these circumstances, acts as an adhesive repelling film and permits easy removal of the block of adhesive from the package.

The package or container is of the tubular type and can be made from a material that normally is bonded by the adhesive. It is essential, however, that the inner wall or surface be smooth, it must resist temperatures of about 300° F. or higher and it must be non-wicking. By non-wicking it is meant that the surface is free of loose filaments, strands or ends of intertwined fibre which will absorb the oily, liquid, polymer away from the inner surface. Loose fibre ends or strands do not always retain sufficient liquid, organo-silicon polymer on their surfaces to be adhesive repellent. Such loose fibres may also become embedded in the solidified adhesive and thereby prevent easy removal of the block. Thus, the container can be fabricated from a metal sheet such as tin, aluminum, steel, copper or terne plate; from fibre, either spirally or convolutely wound, with a metal foil or parchment or glassine or heat resistant plastic inner liner, or from metal or fibre stock with a cured thermosetting resin, such as a phenol aldehyde, urea or melamine aldehyde, or a compatible combination of thermosetting resins covering the inner wall. The tubular body of the container is preferably straight walled or conical and free from beading or grooving or necking in.

The preferred container has a spirally wound fibre body having a uniform diameter and a butt or lap seamed aluminum foil secured to the inner wall. Covers or ends are interiorly lined with a smooth wick free parchment or other suitable lining material. Between each ply is a layer of glue to keep the body adhesively secured. The entire inner surface of the container, both body and ends, is coated with a liquid, oily, organo-silicon polymer.

An example of a thermoplastic hot melt adhesive is one prepared by blending a resinous methoxymethyl substituted linear polyhexamethylene adipamide and a plasticizer comprising 2,2-di-(4-hydroxy-propoxy-phenyl) propane, at a temperature of 350° F. to 400° F. This cement adheres very tenaciously to metal and paper and provides a bond between metals that is comparable to solder.

When the concentration of the methoxymethyl substituted polyhexamethylene adipamide is above 25% the cement at room temperature, is a tough, rubbery solid with very little or no tendency to cold flow, but if the concentration of the polyamide is between 5 and 10% the cement is jelly-like in character and possesses cold flow characteristics. Other n-alkoxy substituted linear polyamides that can be blended with the plasticizer above are disclosed in John D. Czarnecki copending application Serial Number 129,879 for Plasticized Polyamide and Their Methods of Preparation, filed November 28, 1949.

Other thermoplastic cements are those composed of a mixture of vinyl acetate and wood rosins and modifications of the latter, such as rosin esters and hydrogenated rosins. Any thermoplastic adhesive or compatible mixture thereof can be packed by this method, if it is stable and does not decompose at its melting temperature.

The organo-silicon compositions that we found useful are viscous, oily, liquids at room temperatures. They are stable at the adhesive melting temperature, which may be 350 to 400° F. or somewhat higher and their boiling points are approximately as high, or preferably higher than, the filling temperature of the adhesive. Silicone polymers are one example of such materials. The polymers may be formed by subjecting organic chloro silicols (or silanes) to a hydrolyzing and condensing reaction, such as the following:

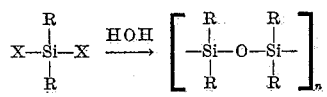

where X represents a halogen preferably chlorine, R represents an organic radical, preferably a monovalent alkyl, or aralkyl hydrocarbon, and $n$ represents an integer greater than 1. Other heat stable organo-silicon liquids that can be employed are those in which the silicon atoms are connected through methylene or phenylene linkages, such as

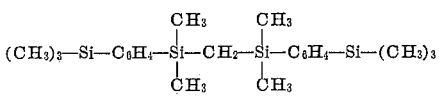

The latter hydrocarbon silyl, hydrocarbon silane compound can be prepared by condensing a chlorophenyl trimethyl silane and

in the presence of sodium in accordance with the following reaction:

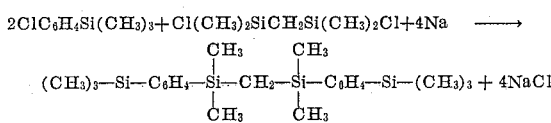

The example shown contains one methylene linkage and two phenylene linkages between the silicon atoms. Compounds having all methylene or all phenylene linkages or any combination of the two, regardless of their spatial position can be substituted, and the aliphatic methylene group can be replaced by other aliphatic hydrocarbon groups having more than one carbon atom. The other hydrocarbon substituents attached to the silicon atoms need not be methyl groups. Other saturated alkyl, aryl or aralkyl groups can replace one or more of the methyl groups, and the number of silicon atoms can be two or more. A specific example of a compound having phenylene bridges between silicon atoms is

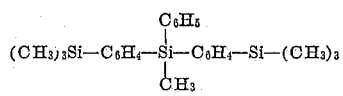

The organo silicon polymers described above are disclosed in H. A. Clark Patents 2,507,514 and 2,507,515 and J. T. Goodwin Patent 2,507,513 all issued on May 16, 1950.

The products formed by reacting a chemical of the type XCH₂SiR₂Y with a compound of the type R₃Si(CH₂SiR₂)ₙY by contacting the former with an alkali metal in liquid phase in the presence of the latter can be employed as the adhesive repelling material. X represents a halogen, Y represents a halogen or an alkoxyl group, R is a monovalent hydrocarbon, and $n$ is a whole number. The product formed by this reaction may be represented by the formula R₃Si(CH₂SiR₂)ₙX in which R represents a monovalent hydrocarbon radical, X is an alkoxy group or a halogen and $n$ is an integer.

A specific example of a compound of the type is (CH₃)₂C₆H₅SiCH₂SiCH₃C₄H₉OC₂H₅. Oily silanol liquids formed by hydrolysis and condensation of the silanes with water and a strong mineral acid can also be used. Compounds of this type are described in United States Patent 2,507,520, J. T. Goodwin, Jr., May 16, 1950.

Mixtures of any of the organo-silicon polymers can be used. An inert colloidal material can be added to the organo-silicon polymer. An example of such composition is a liquid dimethyl polysiloxane thickened with a colloidal silica, such as silica aero-gel. The viscosity of the thickened liquid is somewhat higher than that of the pure organo silicon polymer and is preferred because of its greater resistance to flow on the wall of the empty container. Other colloidal materials that can be added are bentonites, colloidal clay, and kaolin. All these thickeners are silica containing inorganic materials. These can be used alone or in any combination, in any one of the liquid silicon polymers or in any mixture of the organo-silicon polymers.

In practicing our novel method of packaging hot melt adhesives, the interior of each empty container having a non-wicking inner surface is coated with at least one organo-silicon polymer, and preferably with a polymer containing a dispersed colloidal silica aero-gel. The adhesive, after it is thoroughly blended and while it is still molten, is filled into the organo-silicon polymer treated container until the desired volume is reached. The flow of molten adhesive is then shut off and the container is removed and set aside for cooling and solidification or is capped immediately. This cycle of operations is then repeated. If the cap is not interiorly coated with an organo silicon polymer, care must be exercised not to splash the molten adhesive onto it, so as to prevent adhering the cap to the body wall. In some instances where the volume of material packed into the container is fairly large or the container wall very thin, it may be desirable to support the body walls during the filling operation to prevent collapse of the container due to excess fluid pressure thereon.

It is thought that the invention and many of its attendant advantages will be understood from the foregoing description, and it will be apparent that various changes may be made in the form, construction and arrangement of the parts and that changes may be made in the steps of the process described and their order of accomplishment without departing from the spirit and scope of the invention or sacrificing all of its material advantages, the form hereinbefore described being merely a preferred embodiment thereof.

We claim:

1. A method of packaging thermoplastic adhesives and the like in a container made of a material to which the adhesive normally adheres, which method comprises providing a container comprising a bottom member and a fibre body member, said container having a smooth, non-wicking inner surface, coating said surface with an oily, liquid organo-silicon polymer to function as an adhesive repellent, and filling a molten thermoplastic adhesive into the thus treated container whereby said adhesive will not adhere to said surface and may be readily removed.

2. A method of packaging thermoplastic adhesives and the like in a container made of a material to which the adhesive normally adheres, which method comprises providing a container comprising a bottom member and a lined, fibre body member, each of said members being made of heat resistant material and having a smooth, non-wicking inner surface to prevent embedding any strands of said surface in a molten adhesive, coating said surface with an oily, liquid organo-silicon polymer to repel adhesion of a molten adhesive and filling the coated container with a molten thermoplastic adhesive.

3. The method of claim 2 in which the lining of the fibre body member comprises a heat resistant synthetic resin.

4. A method of packing thermoplastic adhesives and the like in a container made of a material to which the adhesive normally adheres, which method comprises coating the interior of a parchment lined fibre container with an oily, liquid organo-silicon polymer to prevent adhesion to said parchment of the adhesive in its tacky filling state, said polymer having an inert colloidal inorganic thickening agent dispersed therein, and filling a molten thermoplastic adhesive into said coated container.

5. A method of packaging thermoplastic adhesives and the like in a container made of a material to which the adhesive normally adheres, which method comprises providing a container comprising a bottom member and a metal foil lined, fibre body member, each of said members being made of a heat resistant material and having a smooth, non-wicking inner surface, coating said inner surface with an oily organo-silicon polymer to repel adhesion of a tacky adhesive and filling the coated container with a molten thermoplastic adhesive.

6. The method of claim 5 in which the metal foil is aluminum.

7. A method of packaging thermoplastic adhesives and the like, which method comprises providing a fibre container having a smooth, non-wicking inner surface coated with an oily, liquid, organo-silicon polymer to repel adhesion of the adhesive to the inner walls of said liner, melting an adhesive comprising a blend of an alkoxy substituted polyhexamethylene adipamide and a plasticizer comprising 2,2-di-(4-hydroxy-propoxy-phenyl) propane, and filling the melted adhesive into said coated container.

8. A package comprising a thermoplastic adhesive and the like in a container, said container comprising in combination a bottom member and a lined fibre body member, each of said members having a smooth, non-wicking inner surface coated with an oily liquid organo-silicon polymer to prevent adhesion of said thermoplastic adhesive to said members, and a cover for said body member.

9. The package set forth in claim 8 in which the lining of the fibre body member comprises a heat resistant synthetic resin.

10. A package comprising a thermoplastic adhesive and the like in a container, said container comprising in combination a bottom member and a parchment paper lined fibre body member, each of said members having a smooth, non-wicking, inner surface and an oily, liquid, organo-silicon polymer coating covering said inner surface to prevent adhesion of said thermoplastic adhesive to said members.

11. A package comprising a thermoplastic adhesive and the like in a container, said container comprising in combination a bottom member and a metal foil lined fibre body member, each of said members having a smooth, non-wicking, inner surface coated with an oily, liquid organo-silicon polymer to prevent adhesion of said thermoplastic adhesive to said members.

12. The package set forth in claim 11 in which the metal foil is aluminum foil.

13. A package comprising a thermoplastic adhesive and the like in a container, said container comprising a bottom member and a fibre body member, at least one of said members having an aluminum foil inner liner and the other having a parchment inner liner, each of said liners having its inner surface coated with an oily, liquid organo-silicon polymer to prevent adhesion of said thermoplastic adhesive to said liners.

14. A package comprising a thermoplastic adhesive and the like in a container, said container comprising in combination a bottom member and a lined fibre body member, each of said members having a smooth, non-wicking inner surface and a coating of an organo-silicon polymer having an inert inorganic thickening agent dispersed therein covering the entire inner surface of said members to prevent adhesion of said thermoplastic adhesive to said members.

15. The package set forth in claim 14 in which the thickening agent is a silica aero-gel.

References Cited in the file of this patent

UNITED STATES PATENTS

| Number | Name | Date |
|---|---|---|
| 1,666,730 | Breeze, Jr. | Apr. 17, 1928 |
| 2,310,712 | Schmied | Feb. 9, 1943 |
| 2,348,622 | Heilman | May 9, 1944 |
| 2,462,242 | Webb et al. | Feb. 22, 1949 |
| 2,470,593 | Webb et al. | May 17, 1949 |
| 2,477,787 | Cook, Jr. | Aug. 2, 1949 |
| 2,606,510 | Collings | Aug. 12, 1952 |